Patent Office
2,987,438
Patented June 6, 1961

2,987,438
ANALGESIC COMPOSITIONS AND METHOD
David M. Ashkenaz, Bala-Cynwyd, Pa., assignor to American Home Products Corporation, New York, N.Y., a corporation of Delaware
No Drawing. Filed Feb. 27, 1956, Ser. No. 568,140
3 Claims. (Cl. 167—52)

This invention deals with novel analgesic compositions and more particularly with compositions of liquids which, when properly used in the form of a continuous stream of liquid (jet spray) directed upon the skin of patients suffering from certain types of pain and discomfort, are capable of relieving the pain and discomfort for an indefinite period of time.

The types of pain particularly adaptable to treatment by the methods and compositions contemplated herein are primarily those conditions of musculo-skeletal pain arising from injury to the muscle itself or to tendons; those referred as the somatic component of certain vascular conditions, such as myocardial infarction and angina pectoris, and as the somatic component of gastrointestinal disease such as peptic ulcer, gallbladder disease, etc.; those associated with muscle spasm in obstetrics; etc.

The use of medicaments and physical agents to relieve these types of pain by local application are well known. These have included liniments, ointments, poultices, etc. These methods have all been noted chiefly by their relative ineffectiveness in relieving the more serious painful episodes. They have also been messy, cumbersome, inconvenient and sometimes harmful in producing unwanted irritation or even lesions.

A particularly effective method of relieving certain types of serious muscular pain in many cases has been described by Dr. Janet Travell in the Archives of Physical Medicine, May 1952, vol. XXXIII, pages 291—298. This method consists essentially in rhythmically spraying the skin with ethyl chloride in the form of a jet.

Although ethyl chloride has been used successfully by this method, in many cases, it has certain disadvantages which make its use dangerous, inconvenient and somewhat limit the scope of its utility. Among these are: its high inflammability, creating an extreme fire hazard in its routine office or home use; the toxicity and general anaesthetic properties of its vapor; the difficulty in avoiding frosting of the skin during its use; its tendency to produce painful irritation of sensitive areas of the skin; etc.

Furthermore, it has been found that when ethyl chloride is sprayed in the form of a jet on the skin, the skin temperature drops precipitously and then slowly rises but does not return to the pretreatment temperature within a reasonably short period of time. Consequently, with each spraying operation in the intermittent series, the skin temperature is increasingly depressed until the danger of freezing the area may require cessation of treatment. Such extreme lowering of the skin temperature also results in prolonged periods of after-pain in the sprayed areas, and, especially in the case of sensitive individuals, will preclude the use of this treatment. Finally, it has also been found that the rate of recovery of normal temperature is not uniform throughout the sprayed skin area.

I have unexpectedly found that, by using certain mixtures of fluorinated halo-hydrocarbons ("Freons" or "Genetrons"), I have not only been able to eliminate the inflammability and toxicity of ethyl chloride, but have also been able to prepare compositions that, when sprayed upon the skin in jet form, produce the desired chilling action, but allow the sprayed area to recover its normal temperature rapidly, thereby greatly reducing the danger of freezing or the excessive cumulative chilling which results in after-pain. These mixtures also have a more uniform chilling action and more uniform rate of recovery of normal temperature over the treated skin area. These advantages have allowed the effective use of this method in many previously untreatable cases.

The mixtures which I have found effective for this purpose are those made up of non-toxic, non-inflammable fluorinated halo-hydrocarbons in the methane and ethane series having a temperature lowering capacity directly proportional to their $V^2L$ (where V is the vapor pressure of the particular fluorinated halo-hydrocarbon at 70° F. expressed in kilograms per square centimeter and L is the latent heat of vaporization of the particular liquid at 70° F. expressed in gram-calories per gram), where $V^2L$ lies in the approximate range of about 85 to 155. Particularly effective, and the preferred embodiment of my invention, is the treatment of a patient by intermittently spraying selected areas of the skin with a jet spray of a mixture described above in which $V^2L$ is equal to about 110. Such a mixture has been found to be most satisfactory in eliminating all of the disadvantages of the ethyl chloride treatment.

To be effectively used, these compositions must be placed in a convenient container having a nozzle or orifice capable of emitting a stream of liquid having a diameter of from about 0.005 to about 0.01 inch and which is capable of being propelled a sufficient distance without breaking up into a spray or into droplets. Such a container may have a suitable capillary tube, flat orifice plate or any other suitable means for accomplishing the desired effect.

There must also be some means for closing the orifice so as to be able to use the spray intermittently. One such closure used by me consisted of a rubber stopper which was opened by pressing on a lever and closed by a spring when the lever was released. Obviously, however, any valve means capable of exerting a similar effect on the stream of liquid would be suitable.

Mixtures of the following compositions and having the values of $V^2L$ as indicated have been prepared:

| | $V^2L$ |
|---|---|
| (1) $CCl_3F$ (Freon 11) 88%, $CCl_2F_2$ (Freon 12) 12% | 93.11 |
| (2) $CCl_3F$ (Freon 11) 85%, $CCl_2F_2$ (Freon 12) 15% | 111.09 |
| (3) $CCl_3F$ (Freon 11) 80%, $CCl_2F_2$ (Freon 12) 20% | 151.43 |
| (4) $CCl_2$—$CClF_2$ (Freon 114) 92%, $CCl_2F_2$ (Freon 12) 8% | 149.12 |
| (5) $CCl_2F$—$CCl_2F$ (Freon 113) 80%, $CCl_2F_2$ (Freon 12) 20% | 141.67 |
| (6) $CClF_2$—$CClF_2$ (Freon 114) 100% | 120.73 |
| (7) $CCl_3F$ (Freon 11) 95%, $CHClF_2$ (Freon 22) 5% | 86.53 |
| (8) $CCl_3F$ (Freon 11) 92%, $CHClF_2$ (Freon 22) 8% | 135.35 |

The above mixtures were placed in containers having an orifice capable of ejecting a narrow continuous stream approximately 0.005 to 0.010 inch in diameter. They were then sprayed in rhythmic intermittent sweeps of about 5 to 15 seconds' duration for periods up to about 10 minutes over the areas of the body indicated by the diagnosis of the ailment and were found to cause the desired pain and discomfort relieving action without excessive chilling or after-pain. Particularly effective in all these respects was mixture No. 2 consisting of 85% Freon 11 and 15% Freon 12.

The above examples are only illustrative of my invention and in no way are intended to limit or restrict its scope beyond the scope of the claims. It is evident that similar mixtures approximating the above compositions would be similarly effective.

I claim:
1. A method of causing intermittent rhythmic chilling action on selected areas of the skin comprising intermittent spraying of said areas with a continuous stream of liquid approximately 0.005 to 0.01 inch in diameter of a composition comprising non-toxic, non-inflammable fluorinated halo-hydrocarbons having not more than two carbon atoms, said mixture having a $V^2L$ in the range of about 85 to 155, V being the vapor pressure at 70° F. expressed in kilograms per square centimeter, and L being the latent heat of vaporization at 70° F. expressed in gram calories per gram.

2. The method according to claim 1 in which $V^2L$ is about 110.

3. The method according to claim 1 in which the composition consists essentially of about 85% $CCl_3F$ and about 15% $CCl_2F_2$.

References Cited in the file of this patent

UNITED STATES PATENTS

| | | |
|---|---|---|
| 2,187,597 | Blaso | Jan. 16, 1940 |
| 2,529,092 | Lodes | Nov. 7, 1950 |
| 2,551,573 | Downing et al. | May 8, 1951 |
| 2,621,014 | Efford | Dec. 9, 1952 |
| 2,728,495 | Eaton | Dec. 27, 1955 |

FOREIGN PATENTS

| | | |
|---|---|---|
| 59,548 | Argentina | Aug. 16, 1947 |

OTHER REFERENCES

Downing: Soap and San. Chem., July 1950, pp. 114–120.

Travell: Arch. Phys. Med., vol. 33, No. 5, May 1952, pp. 291–298.

KTM–8–E. I. du Pont, "Kinetic" Chem. Div., Sept. 1, 1955 (8 pp.; 1, 6 and 7 pert.).

De Navarre: Amer. Perf. and Ess. Oil Review, May 1954, p. 341.